(12) United States Patent
Roy et al.

(10) Patent No.: US 9,703,603 B1
(45) Date of Patent: Jul. 11, 2017

(54) SYSTEM AND METHOD FOR EXECUTING ACCELERATOR CALL

(71) Applicant: FREESCALE SEMICONDUCTOR, INC., Austin, TX (US)

(72) Inventors: Sourav Roy, Kolkata (IN); Michael B. Schinzler, Austin, TX (US)

(73) Assignee: NXP USA, INC., Austin, TX (US)

( * ) Notice: Subject to any disclaimer, the term of this patent is extended or adjusted under 35 U.S.C. 154(b) by 0 days.

(21) Appl. No.: 15/138,014

(22) Filed: Apr. 25, 2016

(51) Int. Cl.
| G06F 9/46 | (2006.01) |
| G06F 9/50 | (2006.01) |
| G06F 9/48 | (2006.01) |
| G06F 9/30 | (2006.01) |

(52) U.S. Cl.
CPC ........ *G06F 9/5011* (2013.01); *G06F 9/30098* (2013.01); *G06F 9/30145* (2013.01); *G06F 9/4881* (2013.01)

(58) Field of Classification Search
None
See application file for complete search history.

(56) References Cited

U.S. PATENT DOCUMENTS

| 4,547,849 | A |  | 10/1985 | Louie et al. |
| 5,299,315 | A |  | 3/1994 | Chin et al. |
| 5,715,439 | A |  | 2/1998 | Schmidt et al. |
| 5,923,893 | A |  | 7/1999 | Moyer et al. |
| 5,944,816 | A |  | 8/1999 | Dutton et al. |
| 6,021,272 | A | * | 2/2000 | Cahill ............ G06F 8/52 717/147 |
| 6,128,641 | A |  | 10/2000 | Fleck et al. |
| 6,134,653 | A |  | 10/2000 | Roy et al. |
| 7,823,033 | B2 | * | 10/2010 | Moyer ........... G06F 9/30112 324/762.01 |
| 8,055,872 | B2 |  | 11/2011 | Biles et al. |
| 8,063,907 | B2 | * | 11/2011 | Lippincott ...... G06F 9/3879 345/502 |
| 8,856,389 | B1 |  | 10/2014 | Li et al. |
| 8,938,072 | B2 | * | 1/2015 | Coric ............. H04L 9/08 380/277 |

(Continued)

OTHER PUBLICATIONS

Jones et al., "An FPGA-based VLIW Processor with Custom Hardware Execution", University of Pittsburgh, Feb. 22, 2005 ACM (Jones_2005.pdf; pp. 107-117).*

*Primary Examiner* — Hiren Patel
(74) *Attorney, Agent, or Firm* — Charles E. Bergere

(57) ABSTRACT

A system for executing an accelerator call function includes a processor, a register context memory, an accelerator scheduler, multiple accelerator cores, and a stack memory. The processor executes a program task. The processor includes a register that stores task context information of the program task. The accelerator call function includes an accelerator operation. The processor forwards the accelerator operation to the accelerator scheduler. Concurrently, the processor stores the task context information in the register context memory. The accelerator scheduler identifies one of the accelerator cores and forwards the accelerator operation to the identified core. The identified core executes the accelerator operation, generates a return value, and stores the return value in the register context memory, which in turn provides the return value and the task context information to the processor.

11 Claims, 3 Drawing Sheets

(56) References Cited

U.S. PATENT DOCUMENTS

| | | | |
|---|---|---|---|
| 8,990,546 B2* | 3/2015 | Wilson | G06F 9/30054 712/242 |
| 9,298,438 B2* | 3/2016 | Nightingale | G06F 8/456 |
| 2002/0042870 A1 | 4/2002 | Rocray et al. | |
| 2002/0073133 A1* | 6/2002 | Misaka | G06F 8/441 718/102 |
| 2006/0070046 A1* | 3/2006 | Balakrishnan | G06F 9/4426 717/138 |
| 2006/0277540 A1* | 12/2006 | Bhattacharya | G06F 11/3636 717/174 |
| 2008/0126611 A1* | 5/2008 | Tu | G06F 3/061 710/31 |
| 2009/0083721 A1* | 3/2009 | Palsberg | G06F 8/441 717/140 |
| 2009/0216958 A1* | 8/2009 | Biles | G06F 13/1668 711/148 |
| 2010/0318996 A1* | 12/2010 | Harris | G06F 9/5033 718/102 |
| 2011/0289298 A1* | 11/2011 | Tsuji | G06F 9/3881 712/202 |
| 2013/0111151 A1* | 5/2013 | Sedlar | G06F 12/0292 711/145 |
| 2013/0339619 A1* | 12/2013 | Roy | G06F 9/3808 711/133 |
| 2014/0189332 A1* | 7/2014 | Ben-Kiki | G06F 9/30145 712/244 |
| 2014/0189713 A1* | 7/2014 | Ben-Kiki | G06F 9/462 718/108 |
| 2014/0282561 A1* | 9/2014 | Holt | G06F 9/462 718/102 |
| 2014/0359636 A1* | 12/2014 | Xu | G06F 9/4856 718/108 |
| 2015/0089495 A1* | 3/2015 | Persson | G06F 9/45533 718/1 |
| 2015/0234679 A1* | 8/2015 | Moyer | G06F 9/4856 718/108 |
| 2015/0317161 A1* | 11/2015 | Murphy | G06F 9/30181 712/228 |
| 2015/0363227 A1* | 12/2015 | Rachamim | G06F 9/4812 718/108 |
| 2016/0062797 A1* | 3/2016 | Holt | G06F 9/4881 718/108 |
| 2016/0292027 A1* | 10/2016 | Moyer | G06F 11/0724 |

* cited by examiner

SYSTEM AND METHOD FOR EXECUTING ACCELERATOR CALL

BACKGROUND

The present invention relates generally to processors and processing systems, and, more particularly, to processor that transfers task context information between processing cores and hardware accelerators.

Conventional data processing systems include processors, such as general purpose processors and digital signal processors, and hardware accelerators that operate in tandem with each other. Hardware accelerators are functional units that perform computationally intensive operations. The hardware accelerators enhance the performance and efficiency of conventional data processing systems. Hardware acceleration is required in 3D graphic processing, signal processing, spam control in servers, cryptography specific operations, and the like. Examples of hardware accelerators include cryptographic co-processors, compression accelerators, pattern-matching accelerators, encryption hardware accelerators, and input/output (I/O) accelerators such as security encryption controllers, Ethernet controllers and network-attached storage accelerators.

FIG. 1 is a schematic block diagram of a conventional data processing system 100 that includes a processor 102, a register context memory 104, an addressable memory 106, an accelerator scheduler 108, a data bus 109, and first through third accelerator cores 110-114. The processor 102 includes a register 116 that stores context information corresponding to a program task executed by the processor 102. The register 116 may comprise multiple types of registers, for example thirty-two (32) general purpose registers and some additional special purpose registers.

The register 116 is connected to the register context memory 104. The processor 102 also is connected to the addressable memory 106 and the accelerator scheduler 108. The addressable memory 106 and the accelerator scheduler 108 are connected to the first through third accelerator cores 110-114 by way of the data bus 109.

The first accelerator core 110 processes a portion of the context information (also referred to as a "set of data"). The processor 102 executes an accelerator call instruction to forward the set of data to one of the first through third accelerator cores 110-114. Upon execution of the accelerator call instruction, the processor 102 performs an operand packing operation on the set of data i.e., modifies the set of data. The operand packing operation transforms the set of data into a consolidated set of data. The processor 102 also stores the set of data i.e., copies the modified set of data to the addressable memory 106.

The accelerator scheduler 108 receives a first accelerator identification (ID) corresponding to the first accelerator core 110 from the processor 102 and schedules the first accelerator core 110 to process the modified set of data. The first accelerator core 110 fetches the modified set of data from the addressable memory 106, processes it, generates a set of results, and stores the set of results in the addressable memory 106. The processor 102 fetches the set of results from the addressable memory 106, and performs an unpacking operation i.e., modifies the set of results by transforming the set of results into an unconsolidated set of results.

The overall performance and efficiency of the data processing system 100 is determined by the communication path between the processor 102 and the accelerator cores 110-114. The operations performed on the set of data such as operand packing and unpacking also determine the performance and the efficiency of the data processing system 100. As the modified set of data is stored in the addressable memory 106, the processor 102 has to perform load and store operations, which introduce latency in the data transfer operation between the processor 102 and the cores 110-114. The operand packing and unpacking operations introduce additional latency in data processing operations performed by the processor 102 and the cores 110-114.

It would be advantageous to have a processor or data processing system that reduces the latency in the data transfer and processing operations.

BRIEF DESCRIPTION OF THE DRAWINGS

The following detailed description of the preferred embodiments of the present invention will be better understood when read in conjunction with the appended drawings. The present invention is illustrated by way of example, and not limited by the accompanying figures, in which like references indicate similar elements.

DETAILED DESCRIPTION

Figure 1:
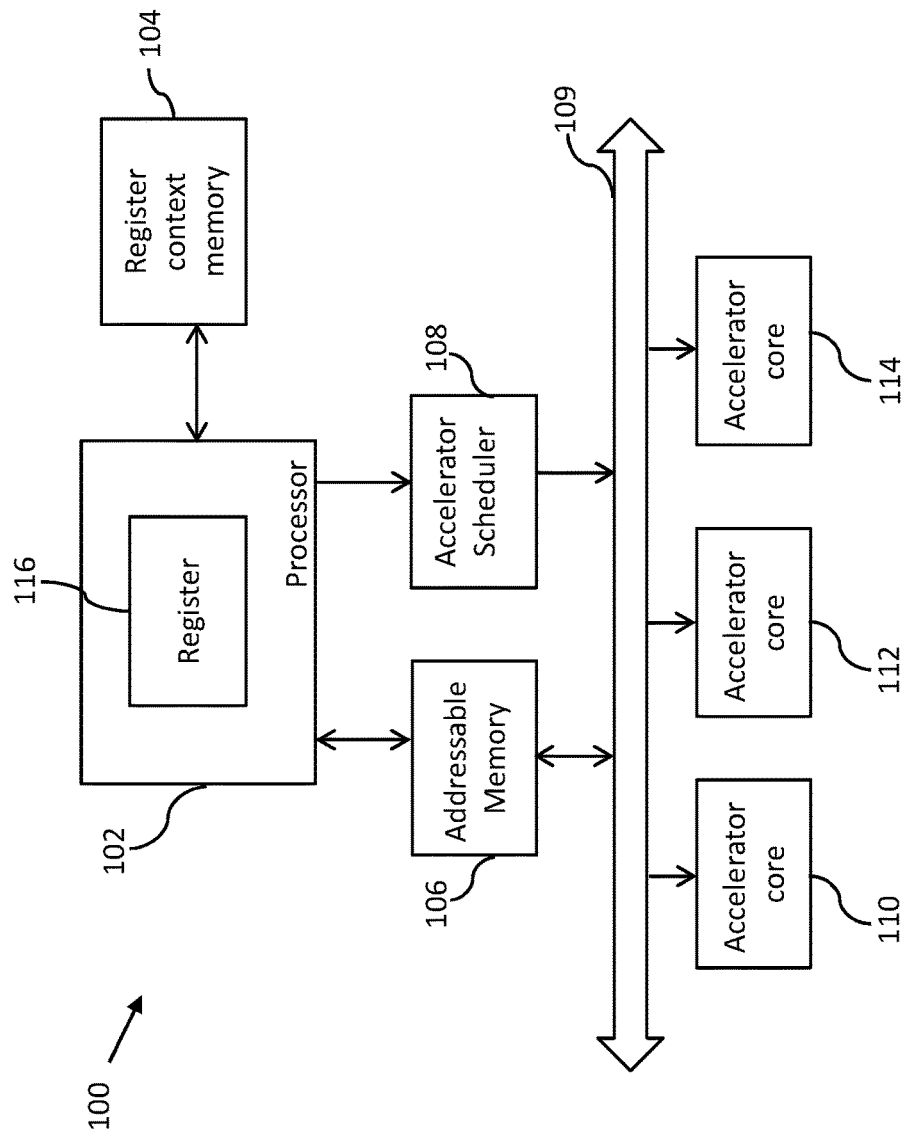
FIG. 1 is a schematic block diagram of a conventional data processing system.

The detailed description of the appended drawings is intended as a description of the currently preferred embodiments of the present invention, and is not intended to represent the only form in which the present invention may be practiced. It is to be understood that the same or equivalent functions may be accomplished by different embodiments that are intended to be encompassed within the spirit and scope of the present invention.

In an embodiment of the present invention, a data processing system is provided. The system includes a processor, a register context memory, an accelerator scheduler, and accelerator cores. The processor includes registers and executes a first program task. The register context memory is connected to the processor. The processor transfers task context information of the first program task from a register to the register context memory for executing an accelerator call instruction. The task context information of the first program task includes a command descriptor of an accelerator call function of the first program task. Further, the accelerator call function includes the accelerator call instruction. The accelerator scheduler, connected to the processor and the accelerator cores, receives the command descriptor and an accelerator ID when the processor transfers the task context information to the register context memory. The accelerator scheduler determines an accelerator core of the accelerator cores based on the accelerator ID for an accelerator operation to be executed by the accelerator core. The accelerator operation is indicated in the command descriptor. Subsequently, the accelerator scheduler provides the command descriptor to the accelerator core. The accelerator core executes the accelerator operation and generates a return value. Finally, the accelerator core stores the return value in the register context memory.

In another embodiment of the present invention, a method for executing an accelerator call function performed by a data processing system is provided. The system includes a processor, a register context memory, an accelerator scheduler, and accelerator cores, and the processor includes registers. The method comprises transferring task context information of a first program task from a register to the register context memory for executing an accelerator call instruction. The task context information includes a command descriptor of the accelerator call function, and the accelerator call function includes the accelerator call instruction. The method further comprises receiving, by the accelerator scheduler, the command descriptor and the accelerator ID from the processor when the processor transfers the task context information to the register context memory. The method further comprises, determining, by the accelerator scheduler, an accelerator core of the accelerator cores for the execution of an accelerator operation. The accelerator core is determined based on the accelerator ID. The method further comprises, providing, by the accelerator scheduler, the command descriptor to the accelerator core. The method further comprises, executing, by the accelerator core, the accelerator operation based on the command descriptor and thereby generating a return value. The method further comprises, storing the return value in the register context memory by the accelerator core. The method further comprises, fetching the return value and the task context information of the first program task by the processor and thereby executing the first program task using the return value by the processor.

Various embodiments of the present invention provide a system for executing an accelerator call function. The system includes a processor, a register context memory, an accelerator scheduler, and multiple accelerator cores. The processor includes a register and executes a program task. The register holds task context information of the program task. The program task includes the accelerator call function that further includes an accelerator call instruction. When the processor receives the accelerator call instruction, the processor transfers the task context information of the program task to the register context memory. Concurrently, the processor transfers a command descriptor and an accelerator ID to the accelerator scheduler. The command descriptor indicates an accelerator operation to be performed by an accelerator core corresponding to the accelerator ID. The accelerator scheduler determines the accelerator core based on the accelerator ID and provides the command descriptor to the accelerator core. The accelerator core executes the accelerator operation and provides a return value to the register context memory.

Thus, the system executes the accelerator call function by transferring the command descriptor directly to the accelerator cores without storing the command descriptor and the task context information in a shared memory such as an addressable memory. The system thereby eliminates the latencies, which are introduced by the use of the shared memory, in the data transfer and processing operations.

In one embodiment, unlike conventional systems that have an addressable memory coupled to the processor, the system of the present invention has a 'stack memory' coupled to the processor. The system executes an accelerator call function without the use of the 'addressable memory' and instead uses the 'register context memory' to store the return value, that is, the accelerator core stores the return value in the register context memory, and the processor fetches the return value and the task context information to execute the first program task using the return value'.

Figure 2:
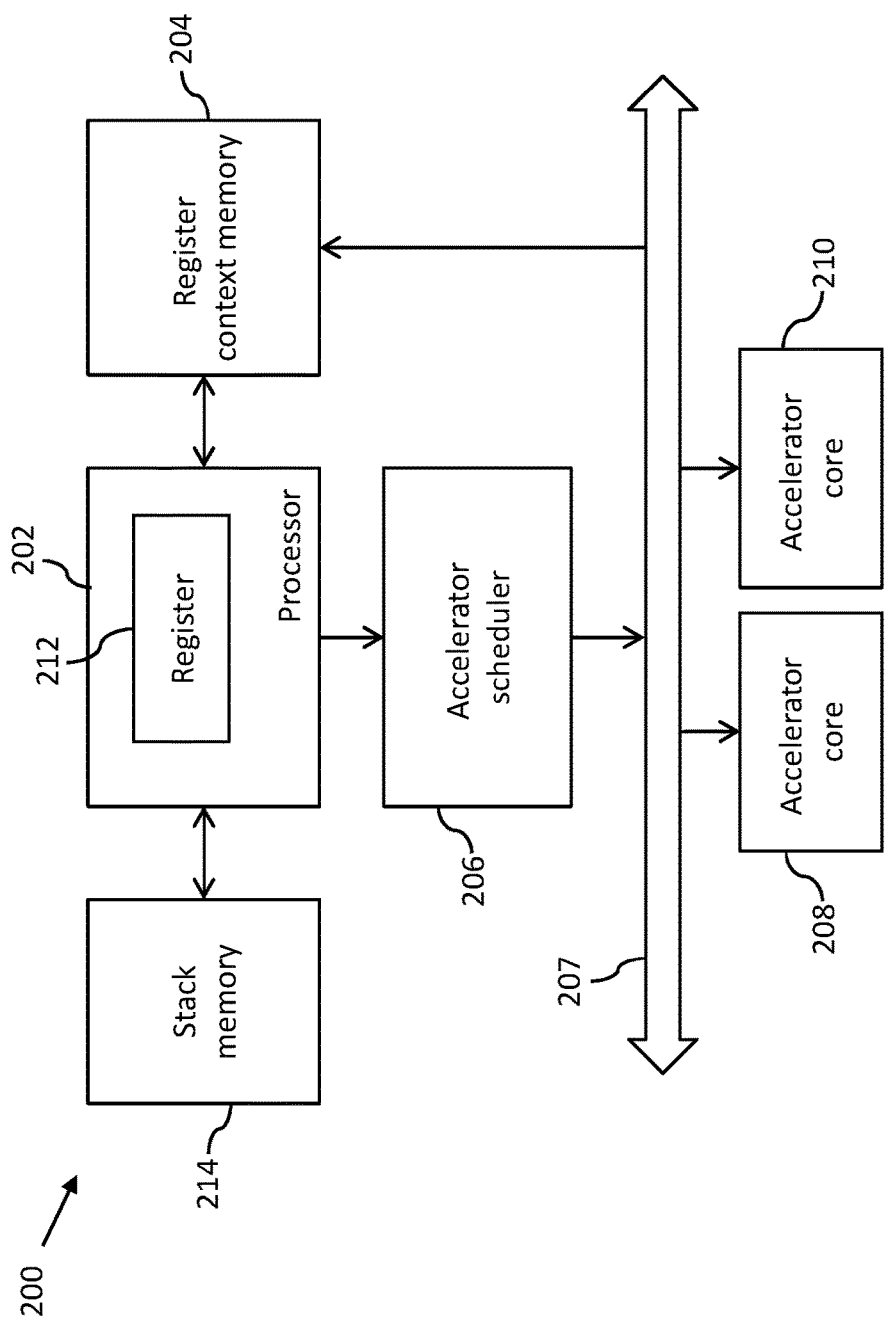
FIG. 2 is a schematic block diagram of a data processing system that can execute an accelerator call function in accordance with an embodiment of the present invention.

Referring now to FIG. 2, a schematic block diagram of a data processing system 200, in accordance with an embodiment of the present invention is shown. The data processing system 200 (henceforth referred to as "system") performs context switching in various data processing operations such as graphics processing, 3D acceleration, cryptographic processing, data encryption, signal processing, and the like. The system 200 includes a processor 202, a register context memory 204, an accelerator scheduler 206, a data bus 207, first and second accelerator cores 208 and 210 (also referred to as "first and second hardware accelerators"), and a stack memory 214. The processor 202 includes a register 212. It will be understood by those of skill in the art that the processing system 200 could comprise plural integrated circuits connected to each other on a PCB (printed circuit board) or a "system on a chip" in which all of the functional blocks are integrated onto a single silicon substrate.

The processor 202 is configured to execute one or more program tasks. The processor 202 may be a single core or multi-core processor. Examples of the program task are a direct memory access (DMA) operation, a graphics processing operation, a cryptographic key generation task, and the like. A program task includes an accelerator call function that further includes an accelerator call instruction, an accelerator operation, and function arguments that correspond to the accelerator operation. The task context information includes data such as operands, function arguments, flag bits, program counter values, and the like, which corresponds to the program task and is generated during the execution thereof. The processor 202 switches between multiple program tasks by switching between the corresponding task context information (also referred to as "context switching").

The register 212 stores the task context information. The register 212 may be either a general purpose register (GPR) or a special purpose register (SPR). The GPR store task context information such as temporary data, addresses, operands, and function arguments of the program task. The SPR stores task context information that indicates the state of the program task. The state of the program task may include program counter, stack pointer, stack limit, subroutine return address, status register, and the like associated with the program task.

The register 212 further stores a command descriptor that indicates the accelerator operation to be performed by at least one of the first and second accelerator cores 208 and 210. The command descriptor includes the function arguments and operands corresponding to the accelerator operation. In one embodiment, the register 212 stores one function argument. In another embodiment, the processor 202 includes multiple registers to store one function argument. In yet another embodiment, the processor 202 includes multiple registers to store multiple function arguments.

The register context memory 204 is connected to the register 212 to receive the task context information therefrom. The register context memory 204 stores the task context information during context switching. The register context memory 204 includes a memory controller (not shown) that handles read and write operations within the register context memory 204.

The accelerator scheduler 206 is connected to the processor 202 to receive the command descriptor. The accelerator scheduler 206 identifies an accelerator core of the first and the second accelerator cores 208 and 210, and forwards the command descriptor to the accelerator core. Subsequently, the identified accelerator core performs the accelerator operation assigned by the processor 202.

The accelerator scheduler 206 transfers the command descriptor to the at least one of the first and second accelerator cores 208 and 210 by way of the data bus 207.

The stack memory 214 is connected to the processor 202 to store additional function arguments when the accelerator call function includes a number of function arguments that exceed the number of registers. The processor 202 receives the function arguments from the stack memory 214 and transfers them to one of the first and second accelerator cores 208 and 210.

The first and second accelerator cores 208 and 210 are hardware functional units that perform computationally intensive operations. Examples of the first and second accelerator cores 208 and 210 include cryptographic co-processors, compression accelerators, pattern-matching accelerators, encryption hardware accelerators, and input/output (I/O) accelerators such as security encryption controllers, Ethernet controllers and network-attached storage accelerators. The first and the second accelerator cores 208 and 210 have first and second accelerator IDs, respectively, that facilitate their identification. The accelerator operation is performed by the first and second accelerator cores 208 and 210. The first and second accelerator cores 208 and 210 receive the command descriptor from the accelerator scheduler 206 which indicates the accelerator operation.

It will be understood by those with skill in the art that the system 200 may include more than one processor. Similarly, the system 200 may include single or multiple register context memories, accelerator schedulers, and accelerator cores.

In operation, the processor 202 executes a first program task that includes the accelerator call function. The accelerator call function includes the accelerator call instruction that triggers the transfer of the command descriptor to one of the first and second accelerator cores 208 and 210. The accelerator call function indicates the accelerator core scheduled to perform the accelerator function. In one embodiment, the accelerator call function includes the first accelerator ID and the accelerator operation to be performed.

When the processor 202 executes the accelerator call function, the processor 202 stores the command descriptor of the accelerator call function in the register 212. The command descriptor includes the function arguments corresponding to the accelerator call function. The register 212 stores one function argument corresponding to the accelerator call function. The processor 202 executes the accelerator call instruction by transferring the command descriptor and the first accelerator ID to the accelerator scheduler 206. Concurrently, the processor 202 transfers the task context information of the first program task to the register context memory 204. The accelerator scheduler 206 identifies the first accelerator core 208, based on the first accelerator ID. The accelerator scheduler 206 provides the command descriptor to the first accelerator core 208 by way of the data bus 207.

On receiving the command descriptor, the first accelerator core 208 executes the accelerator operation specified in the command descriptor. Furthermore, the first accelerator core 208 generates a return value corresponding to the accelerator operation. The first accelerator core 208 stores the return value in the register context memory 204 by way of the data bus 207. The register context memory 204 provides the return value along with the task context information of the first program task to the processor 202. The processor 202 resumes execution of the first program task when it receives the return value and the task context information of the first program task.

In another embodiment of the present invention, when the number of function arguments, corresponding to the command descriptor, exceeds the number of registers, the additional function arguments (also referred to as "the first set of function arguments") are stored in the stack memory 214. Further, the command descriptor of the accelerator call function includes function arguments and operands along with a stack pointer. The stack pointer points to a memory location in the stack memory 214, which stores the additional function arguments corresponding to the accelerator call function. Further, when the first accelerator core 208 receives the command descriptor, the first accelerator core 208 requests the processor 202 to fetch the additional function arguments from the stack memory 214. The processor 202 fetches and provides the additional function arguments from the stack memory 214 to the first accelerator core 208. Subsequently, the first accelerator core 208 executes the accelerator operation and stores a corresponding return value in the register context memory 204.

The processor 202 cannot continue the execution of the first program task without the execution of the accelerator call function. Thus, the processor 202 is idle after the task context information of the first program task is transferred to the register context memory 204. Thus, the processor 202 fetches task context information of a second program task from the register context memory 204 and executes the second program task so that the processor 202 is not idle.

In an alternate embodiment of the present invention, the register 212 adheres to a protocol referred to as an application binary interface (ABI). The ABI protocol defines size, layout and alignment of data types used in the program task. Further, the ABI protocol defines the method by which the function arguments are passed to the first and second accelerator cores 208 and 210 and the method by which the return values are retrieved therefrom. In the system 200, the register 212 transfers the command descriptor of the accelerator call function by conforming to the ABI protocol. In an example, the ABI protocol specifies that the command descriptor of the accelerator call function is transferred to the first accelerator core 208 by way of the register 212. Further, the ABI protocol specifies that the return value generated by the first accelerator core 208 is transferred to the processor 202 by way of the register context memory 204. The ABI protocol optimises the execution speed of the first program task being executed by the system 200.

Thus, the system 200 executes the accelerator call function without storing the task context information in a shared memory such as an addressable memory as in a conventional data processing system. Consequently, the latencies associated with the shared memories are eliminated. Moreover, the system 200 complies with the requirements of the ABI protocol and transfers the command descriptor of the accelerator call function from the register 212 to the first accelerator core 208, thereby improving the efficiency of the system 200 in handling hardware accelerator calls.

Figure 3:
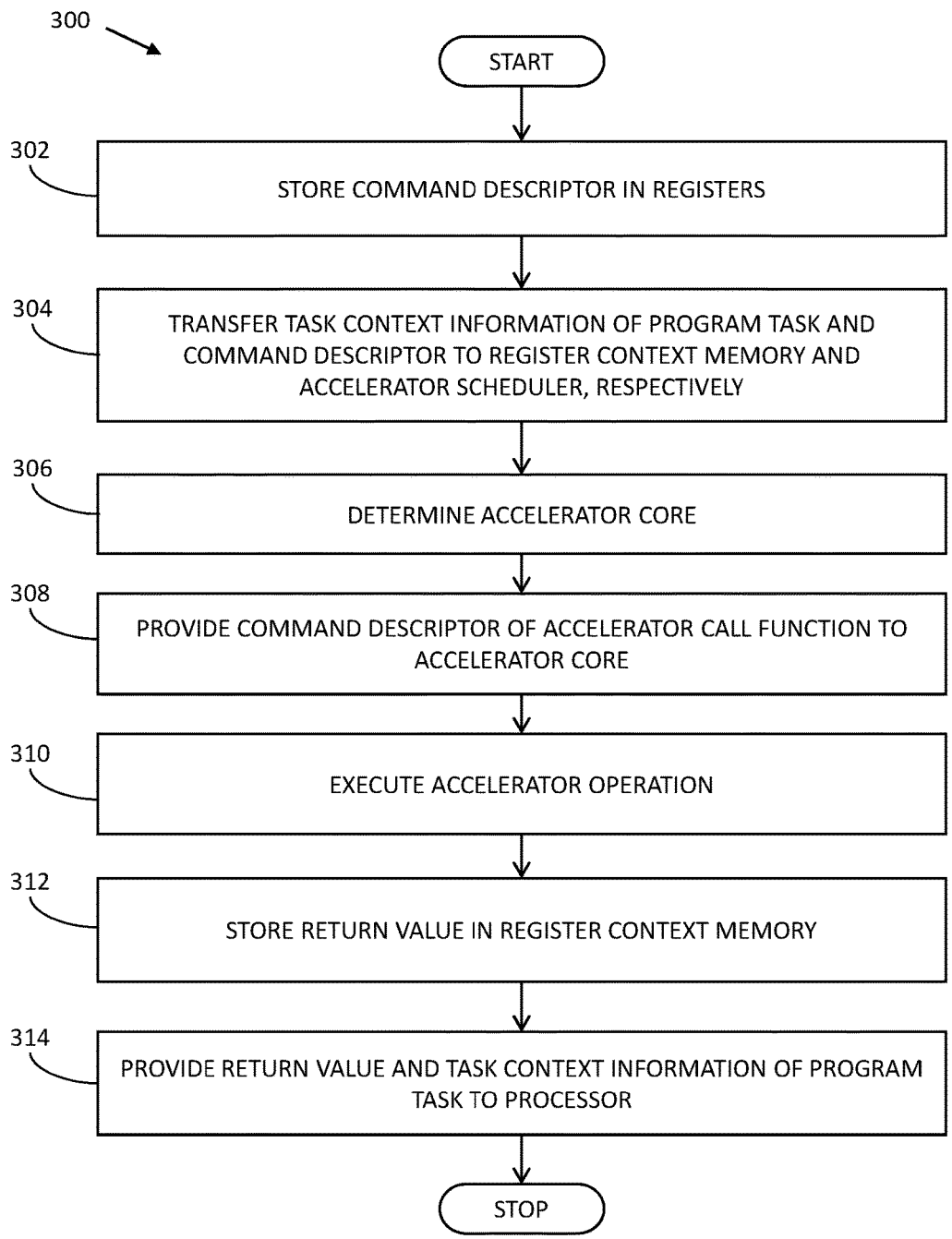
FIG. 3 is a flow chart illustrating a method of executing an accelerator call function in accordance with an embodiment of the present invention.

Referring now to FIG. 3, a flow chart illustrating a method 300 for executing the accelerator call function by the system 200, in accordance with an embodiment of the present invention is shown. The processor 202 executes the program task, which includes the accelerator call function. The accelerator call function includes the accelerator call instruction. At step 302, when the processor 202 executes the accelerator call function, the processor 202 stores the command descriptor in the register 212 prior to the execution of the accelerator call instruction. The processor 202 executes the accelerator call instruction. At step 304, the processor 202 transfers the task context information of the first program task from the register 212 to the register context memory 204. Concurrently, the processor 202 transfers the command descriptor of the accelerator call function and the first accelerator ID to the accelerator scheduler 206. At step 306, the accelerator scheduler 206 identifies the first accelerator core 208, based on the first accelerator ID. At step 308, the accelerator scheduler 206 provides the command descriptor to the first accelerator core 208. At step 310, the first accelerator core 208 executes the accelerator operation. At step 312, the first accelerator core 208 generates a return value corresponding to the accelerator operation. Further, the first accelerator core 208 stores the return value in the register context memory 204. At step 314, the register context memory 204 provides the return value and the task context information of the first program task to the processor 202.

While various embodiments of the present invention have been illustrated and described, it will be clear that the present invention is not limited to these embodiments only. Numerous modifications, changes, variations, substitutions, and equivalents will be apparent to those skilled in the art, without departing from the spirit and scope of the present invention, as described in the claims.

The invention claimed is:

1. A data processing system, comprising:
   a processor that includes a plurality of registers and executes a first program task, wherein a register of the plurality of registers stores task context information of the first program task;
   a register context memory connected to the processor, wherein the processor transfers the task context information from the register to the register context memory for executing an accelerator call instruction of the first program task, wherein the task context information includes a command descriptor of an accelerator call function of the first program task, and wherein the accelerator call function includes the accelerator call instruction;
   an accelerator scheduler, connected to the processor, that receives the command descriptor and an accelerator ID from the processor when the processor transfers the task context information to the register context memory;
   a plurality of accelerator cores connected to the accelerator scheduler and the register context memory;
   wherein the accelerator scheduler selects an accelerator core of the plurality of accelerator cores based on the accelerator ID, and the selected accelerator core receives the command descriptor and executes an accelerator operation based on the command descriptor for generating a return value,
   wherein the command descriptor includes a plurality of function arguments corresponding to the accelerator call function, and the plurality of function arguments are stored in corresponding ones of the plurality of registers,
   wherein a number of the plurality of function arguments exceeds a number of the plurality of registers, and the plurality of function arguments includes a first set of function arguments, and
   a stack memory, connected to the processor, for storing the first set of function arguments, which indicate a difference between the number of the plurality of function arguments and the number of the plurality of registers,
   wherein the selected accelerator core requests the processor to fetch the plurality of function arguments including the first set of function arguments from the stack memory and the corresponding ones of the plurality of registers to execute the accelerator operation based on the command descriptor;
   wherein the selected accelerator core stores the return value in the register context memory, and
   wherein the processor fetches the return value and the task context information from the register context memory to execute the first program task using the return value.

2. The system of claim 1, wherein when the processor transfers the task context information of the first program task from the register to the register context memory, and the register context memory provides task context information of a second program task to the processor.

3. The system of claim 1, wherein the register includes at least one of a general-purpose register and a special-purpose register.

4. The system of claim 1, wherein the accelerator ID is an identification parameter of the accelerator core, and wherein each of the plurality of accelerator cores is assigned an accelerator ID.

5. The system of claim 1, wherein the accelerator operation is indicated by the accelerator call function.

6. The system of claim 1, wherein the plurality of registers and the accelerator call function comply with an application binary interface (ABI) protocol.

7. A method for executing an accelerator call function, comprising:
   transferring, by a processor, task context information of a first program task from a register of a plurality of registers of the processor to a register context memory, for executing an accelerator call instruction, wherein the task context information includes a command descriptor of the accelerator call function, and the accelerator call function includes the accelerator call instruction, wherein the command descriptor includes a plurality of function arguments corresponding to the accelerator call function;
   providing an accelerator ID and the command descriptor to an accelerator scheduler by the processor when the processor transfers task context information to the register context memory;
   selecting an accelerator core of a plurality of accelerator cores based on the accelerator ID by the accelerator scheduler;
   providing the command descriptor, by the accelerator scheduler, to the selected accelerator core;
   wherein the plurality of registers store the corresponding plurality of function arguments; and
   wherein a number of the plurality of function arguments exceeds a number of the plurality of registers, and wherein the plurality of function arguments includes a first set of function arguments;
   storing, by the processor, the first set of function arguments in a stack memory, wherein the first set of function arguments indicates a difference between the number of the plurality of function arguments and the number of the plurality of registers;
   fetching, by the selected accelerator core, the first set of function arguments from the stack memory and the corresponding plurality of function arguments from the plurality of registers;
   executing an accelerator operation by the selected accelerator core based on the command descriptor to generate a return value;

storing, by the selected accelerator core, the return value in the register context memory;

fetching the return value and the task context information of the first program task by the processor; and executing, by the processor, the first program task using the return value.

8. The method of claim 7, further comprising fetching task context information of a second program task by the processor after the task context information of the first program task has been transferred to the register context memory.

9. The method of claim 7, wherein the accelerator ID is an identification parameter of the selected accelerator core, and each of the plurality of accelerator cores is assigned an accelerator ID.

10. The method of claim 7, wherein the accelerator call function indicates the accelerator operation.

11. The method of claim 7, wherein the plurality of registers and the accelerator call function comply with an application binary interface (ABI) protocol.

* * * * *